(12) United States Patent
Park et al.

(10) Patent No.: US 10,062,406 B2
(45) Date of Patent: Aug. 28, 2018

(54) VIDEO MASKING PROCESSING METHOD AND APPARATUS

(71) Applicant: Korea Electronics Technology Institute, Seongnam-si, Gyeonggi-do (KR)

(72) Inventors: Sang Hyun Park, Jeonju-si (KR); Sung Hwan Jeong, Jeonju-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 14/953,179

(22) Filed: Nov. 27, 2015

(65) Prior Publication Data

US 2016/0155465 A1    Jun. 2, 2016

(30) Foreign Application Priority Data

Nov. 28, 2014 (KR) .......................... 10-2014-0168097

(51) Int. Cl.
| | | |
|---|---|---|
| *H04N 9/80* | (2006.01) | |
| *H04N 5/93* | (2006.01) | |
| *G09G 5/00* | (2006.01) | |
| *G06K 9/00* | (2006.01) | |
| *G11B 20/00* | (2006.01) | |
| *H04N 21/00* | (2011.01) | |

(Continued)

(52) U.S. Cl.
CPC ...... *G11B 20/005* (2013.01); *G11B 20/00086* (2013.01); *G11B 20/00478* (2013.01); *G11B 20/00492* (2013.01); *H04N 21/00* (2013.01); *G11B 27/031* (2013.01); *G11B 27/34* (2013.01); *H04N 5/76* (2013.01); *H04N 9/8042* (2013.01)

(58) Field of Classification Search
CPC .............. G11B 27/34; G11B 20/00478; G06T 2201/0051; G07C 9/00158; G09G 3/003; G09G 2320/0247; H04N 9/8042; H04L 2209/16
USPC .......... 386/241, 278, 280; 345/96, 209, 629; 382/100
See application file for complete search history.

(56) References Cited

U.S. PATENT DOCUMENTS

| | | | | |
|---|---|---|---|---|
| 8,194,127 B2 * | 6/2012 | Kang | ..................... | G06T 7/0026 348/143 |
| 8,532,468 B2 * | 9/2013 | Togo | ..................... | H04N 7/007 386/278 |

(Continued)

FOREIGN PATENT DOCUMENTS

| | | |
|---|---|---|
| KR | 1020090104349 A | 10/2009 |
| KR | 101458136 B1 | 11/2014 |

*Primary Examiner* — Thai Tran
*Assistant Examiner* — Syed Hasan
(74) *Attorney, Agent, or Firm* — Hauptman Ham, LLP

(57) ABSTRACT

A video masking processing method and a video masking processing apparatus using the same are provided. The video masking processing method photographs frames constituting a video, detects at least one masking area to be masked in the photographed frames, masks an image in the detected at least one masking area, inserts masking information including information on the masking into the photographed frame, and stores the frame which has undergone the masking and has the masking information inserted thereinto. Therefore, since images related to personal information in a photographed video are masked, a user does not infringe others' privacy in a video normally photographed by a CCTV or a dashboard camera.

4 Claims, 16 Drawing Sheets

(51) Int. Cl.
*G11B 27/34* (2006.01)
*H04N 9/804* (2006.01)
*H04N 5/76* (2006.01)
*G11B 27/031* (2006.01)

(56) References Cited

U.S. PATENT DOCUMENTS

| | | | | |
|---|---|---|---|---|
| 8,666,110 | B2* | 3/2014 | Yoo | G06T 1/00 |
| | | | | 382/100 |
| 9,330,613 | B2* | 5/2016 | Ito | G09G 3/3648 |
| 2010/0209069 | A1* | 8/2010 | Fountaine | G11B 27/034 |
| | | | | 386/278 |
| 2016/0080155 | A1* | 3/2016 | Arat | G06F 21/6209 |
| | | | | 380/28 |

* cited by examiner

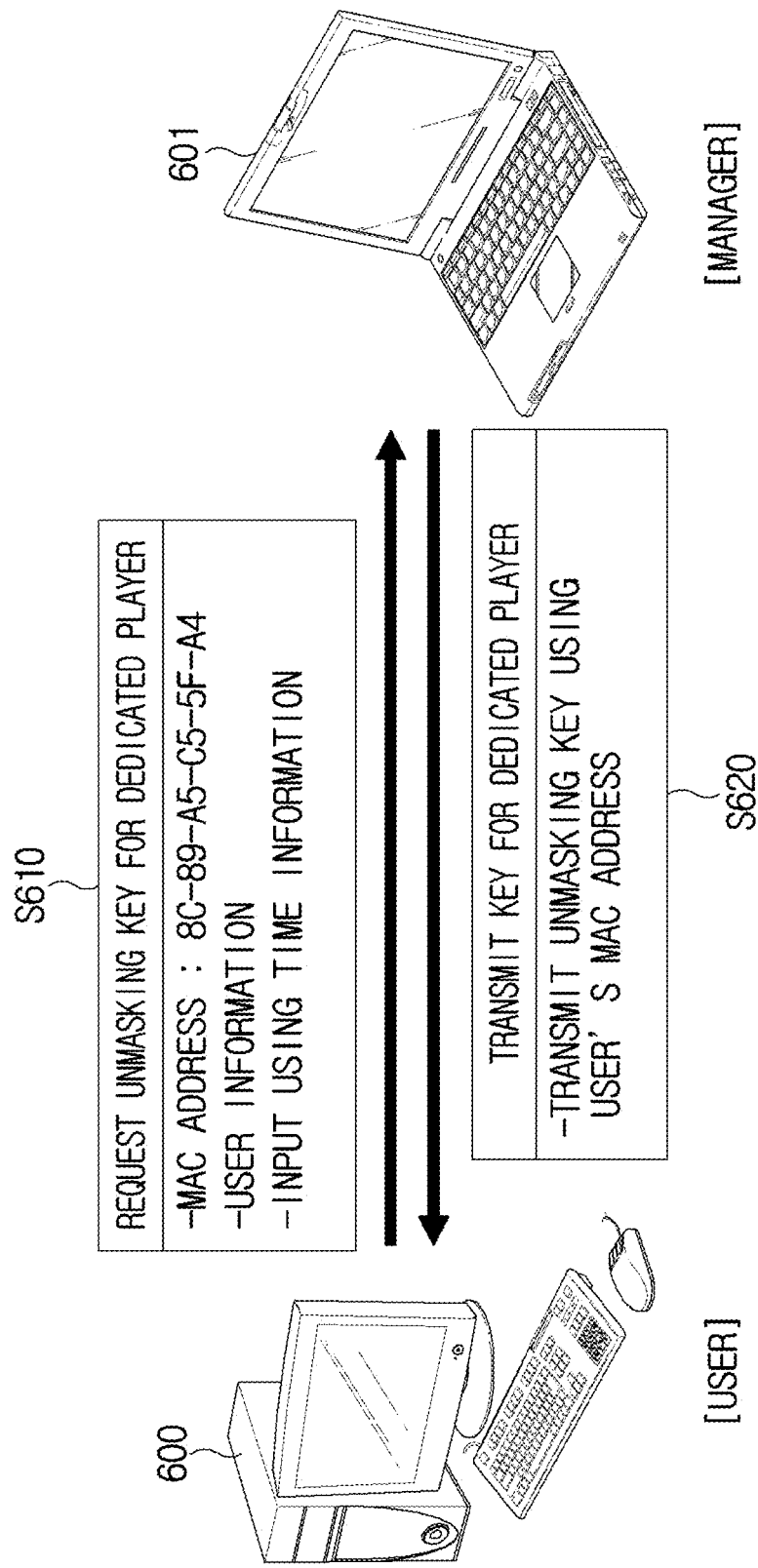

VIDEO MASKING PROCESSING METHOD AND APPARATUS

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Nov. 28, 2014, and assigned Serial No. 10-2014-0168097, the entire disclosure of which is hereby incorporated by reference.

TECHNICAL FIELD OF THE INVENTION

The present disclosure relates generally to a video masking processing method and apparatus, and more particularly, to a video masking processing method which masks a specific area of a video to protect personal privacy, and a video masking processing apparatus applying the same.

BACKGROUND OF THE INVENTION

As a related-art masking technique which can be used in a monitoring image, an image processing method which recognizes a face or a vehicle number plate for identifying an individual, and hides the recognized area is mainly used. Such a masking technique can hide a detected area, but has a demerit of having to have information on an original image in order to restore the hidden area to the original image.

In Korea, a H. 264 codec-based dynamic privacy masking/unmasking technique has been developed. This technique enables an original image to be restored according to authority, and is a masking technique using a manufactured H. 264 codec. This technique can identify an original image by unmasking a masked image according to whether the corresponding codec is used or not. However, when the codec allowing unmasking is used, the image may be unmasked in a normal video player, and thus there is a problem that personal information may be leaked.

In the related-art image recognition and storage system described above, a front camera installed in a vehicle obtains and records real-time images and voices. In this case, other vehicles or other persons' faces are recorded. When a corresponding video is edited and uploaded on the Internet, there is a problem of infringement of personal information.

Due to the problem of infringement of personal information, in Korea and abroad, there are movements to obligate dashboard cameras currently installed in vehicles to be equipped with a masking function to hide and store vehicle number plates and persons' faces in recording images in the dashboard cameras.

Accordingly, in the future, normal users would not be allowed to identify other persons' faces and others' vehicle number palates even when images are recorded by dashboard cameras installed in their own vehicles. In order to prevent this, vehicle number plates and persons' faces should be automatically masked by using a pattern recognition and image processing technique.

Accordingly, there is a demand for a method for masking a video more efficiently and more securely.

SUMMARY OF THE INVENTION

To address the above-discussed deficiencies of the prior art, it is a primary aspect of the present disclosure to provide a video masking processing method, which stores information on an area masking-processed in a photographed frame in the frame, and a video masking processing apparatus applying the same.

According to one aspect of the present disclosure, a video masking processing method of a video masking processing apparatus includes: photographing frames constituting a video; detecting at least one masking area to be masked in the photographed frames; masking an image in the detected at least one masking area; inserting masking information including information on the masking into the photographed frame; and storing the frame which has undergone the masking and has the masking information inserted thereinto.

In addition, the photographing, the detecting, the masking, the inserting, and the storing may be repeated for all of the frames of the video.

In addition, the masking area may include an area including a person's face or an area including a vehicle number plate.

The masking information may include information on a number of masking areas in the frame, and masking area information which exists as many as the number of the masking areas, and the masking area information may include an identifier of a corresponding masking area, information on a masking technique code applied to a corresponding masking area, coordinates information of a left upper point of a corresponding masking area, and coordinates information of a right lower point of a corresponding masking area.

In addition, the inserting may include inserting the masking information into a predetermined pixel area of the frame.

The video masking processing method may further include: transmitting a request to reproduce the video which is formed of the frames which have undergone the masking and have the masking information inserted thereinto; receiving a key for unmasking the video as a response to the reproduction request; and unmasking the video using the key and reproducing the video.

In addition, the key may be generated using a MAC address and may be a key in the form of an image.

The video masking processing method may further include: displaying at least one vehicle plate number or person's face included in the video using the masking information included in the video; and, when one of the at least one vehicle plate number or person's face is selected, reproducing a part of the video that includes the selected vehicle plate number or person's face.

In addition, the video masking processing method may further include: inputting, by a user, a vehicle plate number; recognizing at least one vehicle plate number included in the video using the masking information included in the video; and reproducing a part of the video that includes the inputted vehicle plate number.

According to another aspect of the present disclosure, a video masking processing apparatus includes: a photographing unit configured to photograph frames constituting a video; a processing unit configured to detect at least one masking area to be masked in the photographed frames, mask an image in the detected at least one masking area, and insert masking information including information on the masking into the photographed frame; and a storage unit configured to store the frame which has undergone the masking and has the masking information inserted thereinto.

According to various exemplary embodiments of the present disclosure, a video masking processing method, which photographs frames constituting a video, detects at least one masking area to be masked in the photographed frames, masks an image in the detected at least one masking area, inserts masking information including information on the masking into the photographed frame, and stores the frame which has undergone the masking and has the masking information inserted thereinto, and a video masking processing apparatus applying the same are provided. Therefore, since images related to personal information in a photographed video are masked, a user does not infringe others' privacy in a video normally photographed by a CCTV or a dashboard camera.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a view showing a process of reproducing a masking-processed video according to an exemplary embodiment of the present disclosure;

DETAILED DESCRIPTION OF THE INVENTION

Figure 1:
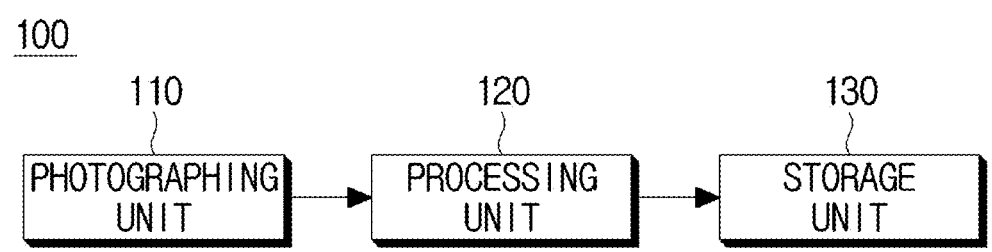
FIG. 1 is a view schematically showing a configuration of a video masking processing apparatus according to an exemplary embodiment of the present disclosure.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

FIG. 1 is a view schematically showing a configuration of a video masking processing apparatus 100 according to an exemplary embodiment of the present disclosure. The video masking processing apparatus 100 removes others' vehicle plate number or others' faces from a photographed video to protect others' personal information which is not necessary for the photographed video. In an image monitoring technique for monitoring vehicles and persons in an image photographed by a camera such as a dashboard camera, there is a problem that the photographed image is recorded randomly and thus personal information is leaked, and thus the problem of infringement of privacy has become a social issue. Therefore, to prevent leakage of others' personal information, the video masking processing apparatus 100 detects pedestrians, pedestrians' faces, vehicles ahead, and vehicle plate numbers using an image pattern recognition technique, and then masks the recognized object area and voice and stores the same as a video using a masking technique.

The video masking processing apparatus 100 may be provided in a camera device, a computer or a smart phone, or a CCTV or a dashboard camera. As shown in FIG. 1, the video masking processing apparatus 100 includes a photographing unit 110, a processing unit 120, and a storage unit 130.

The photographing unit 110 photographs frames constituting a video. That is, the photographing unit 110 photographs a video on a frame basis, and may be any device that can photograph a video such as a video camera, a camcorder, etc.

The processing unit 120 masks the frame of the photographed video. Specifically, the processing unit 120 detects at least one masking area to be masked from the photographed frame, masks an image in the detected at least one masking area, and inserts masking information including information on the masking into the photographed frame. The processing unit 120 may be applied to a processing device such as a graphic processing device or a CPU.

The storage unit 120 stores the frame which has undergone the masking process and has the masking information inserted thereinto. The storage unit 120 stores all of the frames of the video which has been processed as described above, and as a result, stores the masking-processed video. In addition, the storage unit 120 may store a variety of other data and may be a flash memory, a hard disk, a solid state disk (SDD), etc.

The video masking processing apparatus 100 having the above-described configuration performs the masking process with respect to an area related to personal information in the photographed image and stores the image, thereby protecting personal privacy which was inadvertently photographed.

Figure 2:
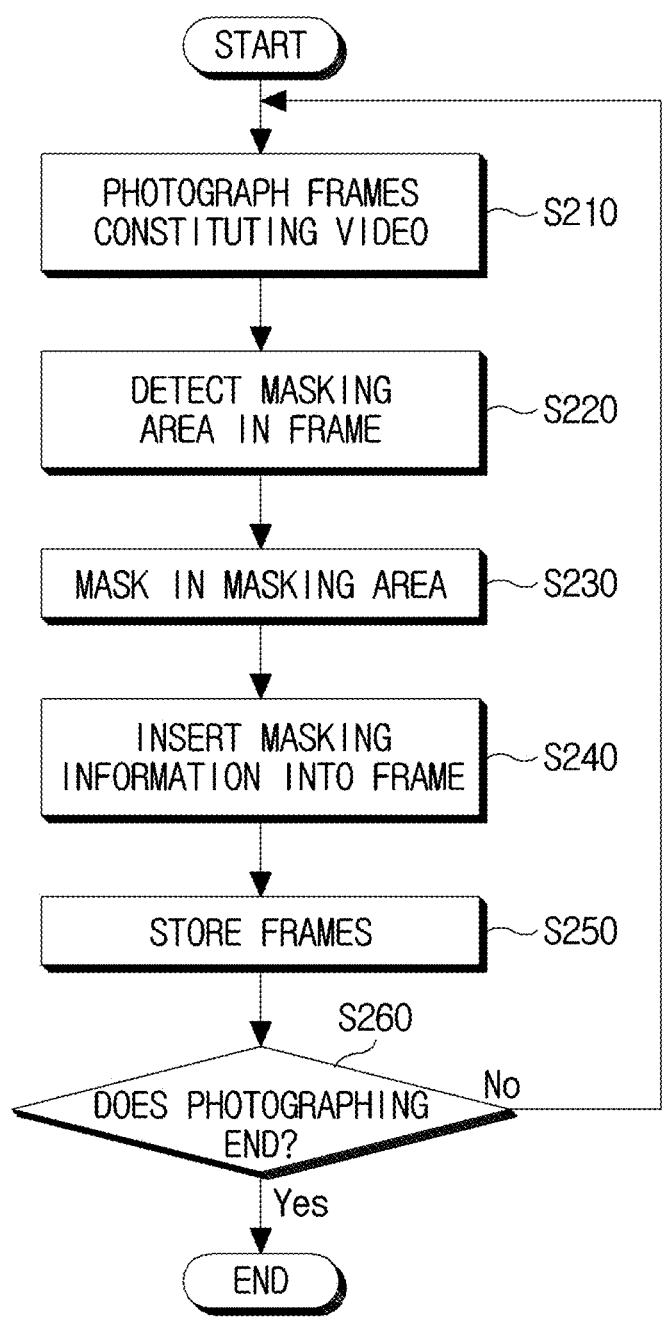
FIG. 2 is a flowchart showing a video masking processing method according to an exemplary embodiment of the present disclosure.

FIG. 2 is a flowchart to illustrate a video masking processing method of the video masking processing apparatus 100 according to an exemplary embodiment of the present disclosure.

First, the video masking processing apparatus 100 photographs frames constituting a video (S210). The video is formed of a plurality of frames, and the video masking processing apparatus 100 performs a masking process with respect to each of the frames of the photographed video.

Next, the video masking processing apparatus 100 detects at least one masking area to be masked in the photographed frame (S220). Herein, the masking area refers to an area which includes others' personal information unnecessarily existing in the frame of the photographed video. For example, the masking area may indicate an area which includes a person's face or an area which includes a vehicle number plate. Since a single frame includes a plurality of vehicle number plates or a plurality of persons' faces, a single masking area or a plurality of masking areas may be included in the single frame. In this case, the video masking processing apparatus 100 may recognize a person's face or a vehicle number plate using an image pattern recognition technique, and, when the vehicle number plate is recognized, may recognize what number the corresponding vehicle is.

Thereafter, the video masking processing apparatus 100 masks an image in the detected at least one masking area (S230). Herein, the masking refers to a process of making an image of a corresponding area unrecognizable, and is performed in various ways. For example, in the case of an image masking technique, the video masking processing apparatus 100 masks the image by encoding through Discrete Cosine Transform (DCT), quantization, zig-zag scan, run-length technique, and Huffman coding. In this case, the video masking processing apparatus 100 may use a specific key value to mask the image, and the specific key value may be used for unmasking afterward.

Next, the video masking processing apparatus 100 inserts masking information including information on the masking into the photographed frame (S240). Herein, the masking information indicates information on how the masking area has been masked. The detailed structure of the masking information is illustrated in FIG. 3.

Figure 3:
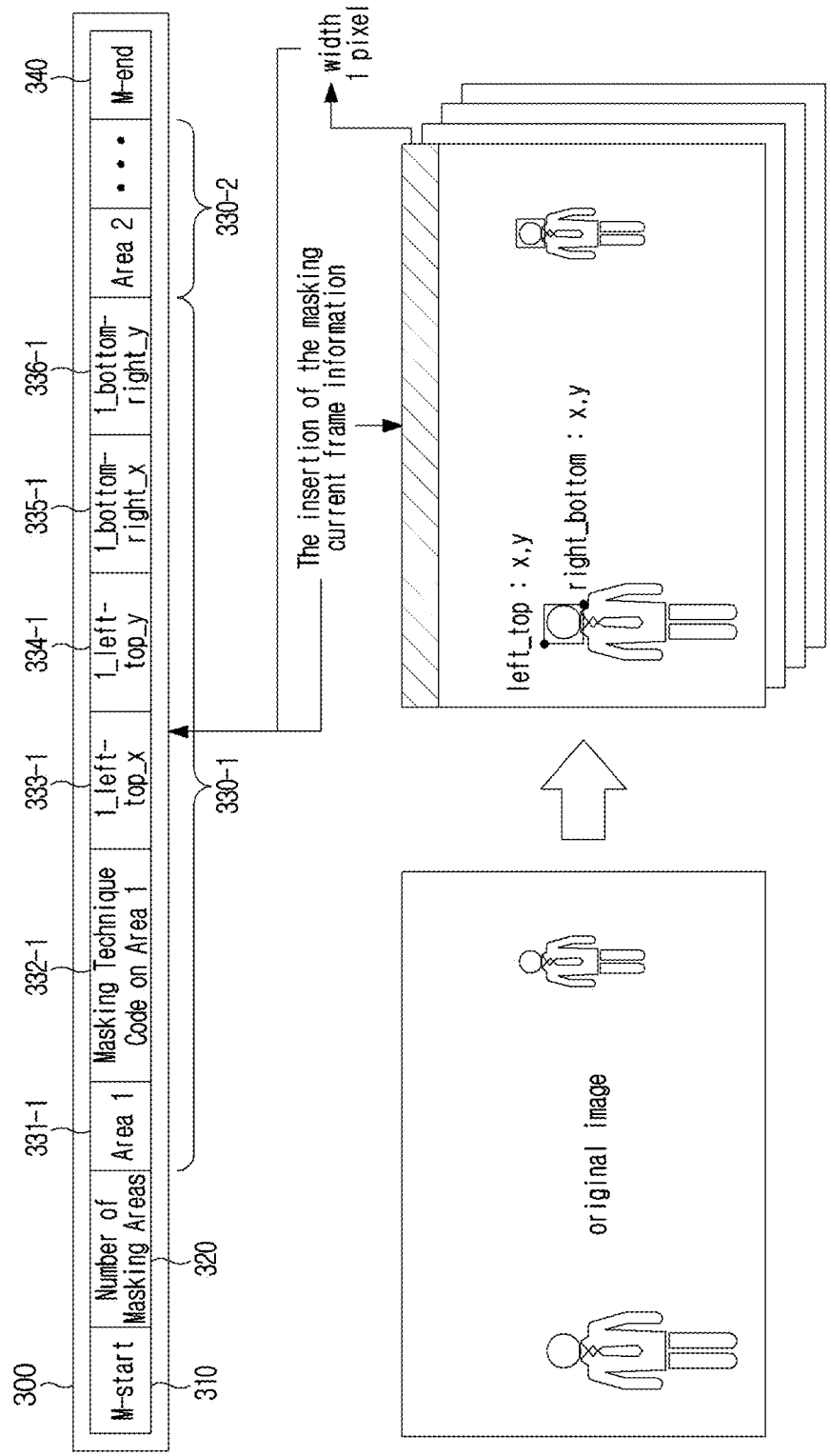
FIG. 3 is a view showing a structure of masking information according to an exemplary embodiment of the present disclosure.

FIG. 3 is a view showing a structure of masking information 300 according to an exemplary embodiment of the present disclosure. As shown in FIG. 3, the masking information 300 includes start information (M-Start) 310, information on the number of masking areas in a frame 320, masking area information 330-1, 330-2 corresponding to each of the masking areas, and end information (M-end) 340.

The start information (M-start) 310 refers to a start pixel from which the masking information is recorded. The end information (M-end) 340 refers to a last pixel where the masking information is recorded.

The information on the number of masking areas in the frame 320 is an area indicating how many masking areas exist in a corresponding frame.

The masking area information 330-1, 330-2 includes location information on one masking area and information on the masking technique, and as many pieces of masking area information as the number of masking areas exist. Since two masking area exist, the masking information includes two pieces of masking area information, first masking area information 330-1 and second masking area information 330-2 in FIG. 3.

Specifically, the first masking area information 330-1 includes an identifier 331-1 of the corresponding masking area, masking technique code information 332-1 applied to the masking area, coordinates information 333-1, 334-1 of a left upper point of the corresponding masking area, and coordinate information 335-1, 336-1 of a right lower point of the corresponding masking area. The second masking area information 330-2 has the same structure as the first masking area information 330-1, and thus is omitted from FIG. 3.

The masking information 300 having the above-described structure indicates how many masking areas are included in the corresponding frame, where each of the masking areas is located, and how each of the masking areas is masked.

In addition, the video masking processing apparatus 100 inserts the masking information 300 generated as described above into a predetermined pixel area of the corresponding frame. Since the masking information 300 has a relatively small amount of data, the masking information 300 may be recorded using only one or a few pixels in the frame.

Referring back to FIG. 2, the video masking processing apparatus 100 stores the frame which has undergone the masking process and have the masking information inserted thereinto (S250). That is, the video masking processing apparatus 100 can store the masking information 300 with the video by simply storing only the corresponding frame without having to store the masking information 300 in a separate storage area.

Thereafter, the video masking processing apparatus 100 determines whether the photographing ends or not (S260). When the photographing does not end (S260-N), the video masking processing apparatus 100 resumes step S210. That is, the video masking processing apparatus 100 repeats steps 210 to 250 described above for all of the frames of the photographed video.

Through the above-described process, the video masking processing apparatus 100 can perform the masking process with respect to the photographed video and store the video, and store the information related to the masking in the corresponding video.

Figure 4A:
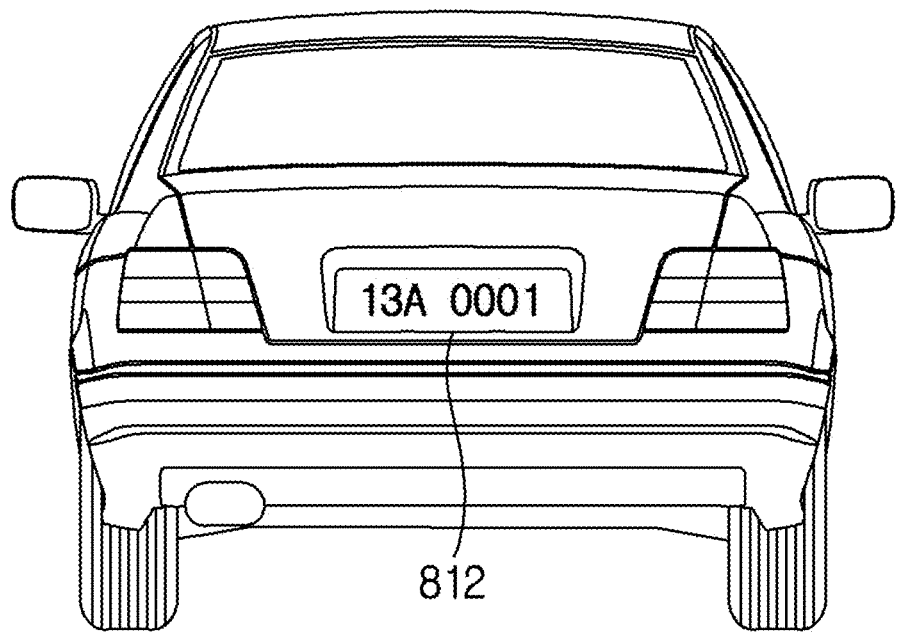
FIGS. 4A and 4B are views showing original images according to an exemplary embodiment of the present disclosure.
Figure 4B:
Figure 5A:
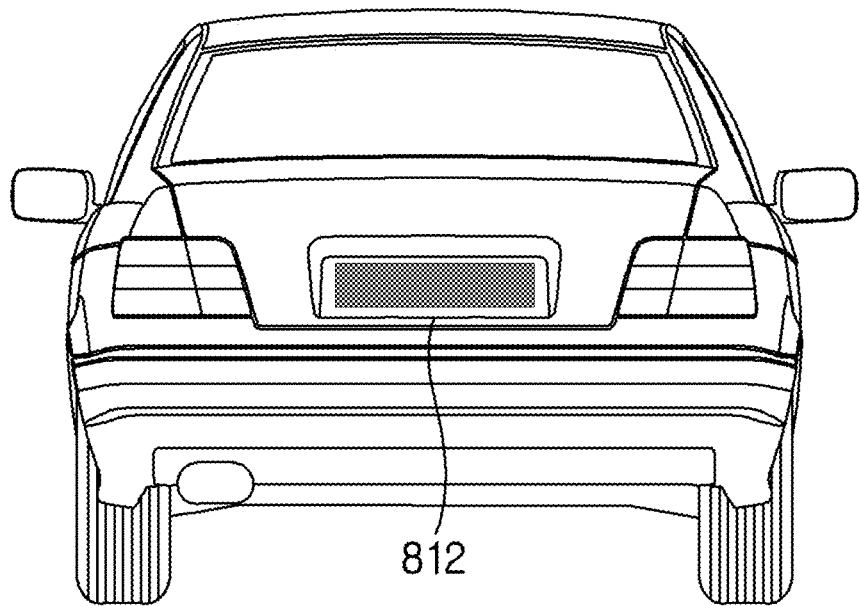
FIGS. 5A and 5B are views showing images in which vehicle plate numbers and persons' faces are masked according to an exemplary embodiment of the present disclosure.
Figure 5B:

FIGS. 4A and 4B are views showing originals images according to an exemplary embodiment of the present disclosure, and FIGS. 5A and 5B are views showing images in which vehicle plate numbers and persons' faces are masked according to an exemplary embodiments of the present disclosure.

As shown in FIGS. 4A and 4B, in the originals images, the vehicle number plates or the persons' faces are displayed as they are. However, in FIGS. 5A and 5B, the masking-processed vehicle plate numbers and persons' faces are displayed.

As described above, the video masking processing apparatus 100 masks vehicle plate numbers and persons' faces in order to protect personal information of passing walkers or vehicles, and stores the image as shown in FIGS. 5A and 5B.

However, the vehicle plate number or person's face may need to be identified to be used as evidence of an accident or a crime afterward. Therefore, there is a need for a method for unmasking a masking-processed video. This will be explained in detail below.

FIG. 6 is a view showing a process of reproducing a masking-processed video according to an exemplary embodiment of the present disclosure. In FIG. 6, a user device 600 may indicate the video masking processing apparatus 100 or an apparatus which receives a video which has been masking-processed and recorded by the video masking processing apparatus 100 to unmask and then reproduce the video. The user device 600 capable of unmasking may be used in a public institution or a police station.

In addition, a manager device 601 indicates a device of a manager who manages reproduction authority of a masked video. The manager device 601 may be a device of a company which provides masking processing and video services.

The user device 600 and the manager device 601 may be computers or servers.

First, the user device 600 transmits, to the manager device 601, a request to reproduce a video which is formed of frames which have undergone a masking process and have masking information inserted thereinto (S610). In this case, the user device 600 may also transmit its own MAC address, user information, and using time information. In addition, the user device 600 may use a dedicated player to reproduce the masked video.

Figure 7:
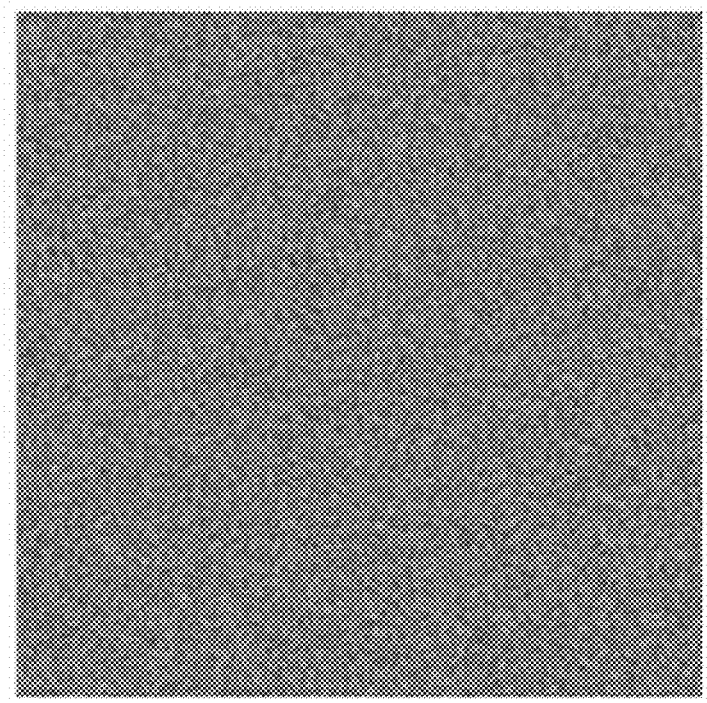
FIG. 7 is a view showing a key in the form of an image according to an exemplary embodiment of the present disclosure.

Then, the manager device 601 transmits a key for unmasking the video to the user device 600 in response to the reproduction request (S620). In this case, the key may be generated using the MAC address, and may be a key in the form of a text or an image. FIG. 7 is a view showing a key in the form of an image according to an exemplary embodiment of the present disclosure. As shown in FIG. 7, when the key in the form of the image is used, the security of the key can be improved.

After receiving the key, the user device 600 unmasks the video using the key and reproduces the video. In this case, the user device 600 may reproduce the video using a dedicated player.

Through the above-described process, the user device 600 unmasks the making-processed video and reproduces the video.

Hereinafter, additional functions using masking information will be explained with reference to FIGS. 8 to 12B.

Figure 8:
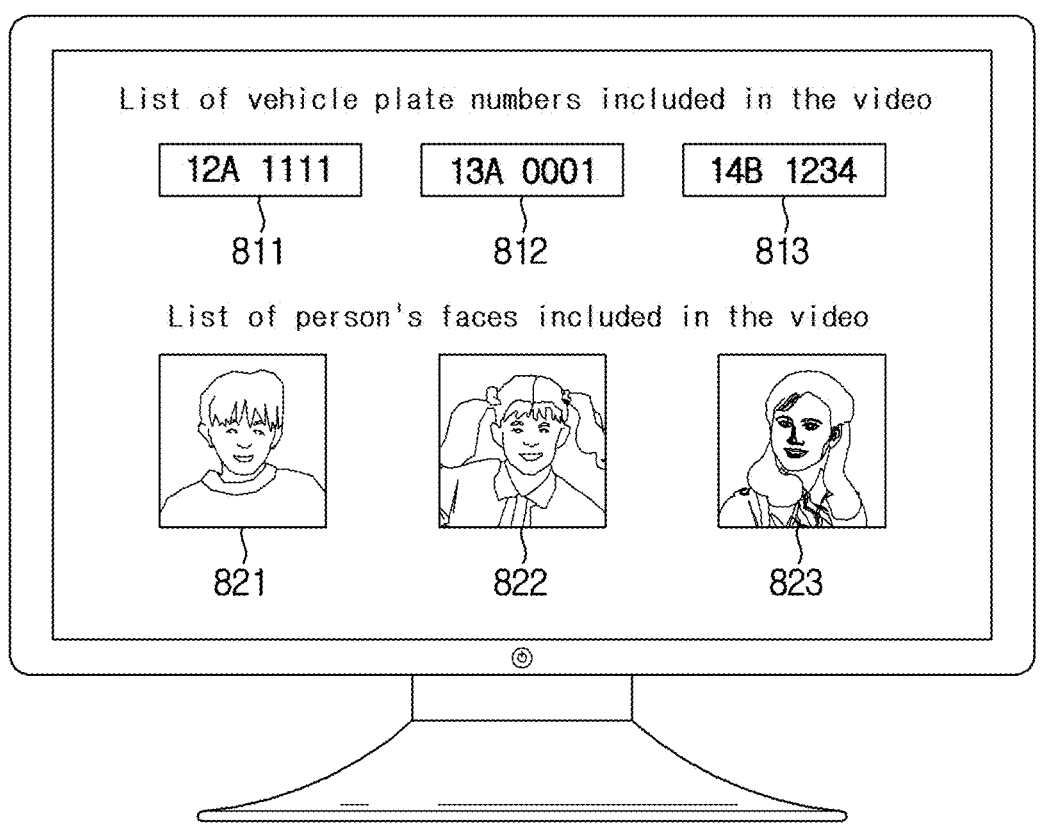
FIG. 8 is a view showing a screen which displays a list of vehicle plate numbers and a list of person's faces included in a masking-processed video according to an exemplary embodiment of the present disclosure.

FIG. 8 is a view showing a screen which displays a list of vehicle plate numbers and a list of persons' faces included in a masking-processed video according to an exemplary embodiment of the present disclosure.

The masking information includes information on vehicle plate numbers and persons' faces in a video. Therefore, the video masking processing apparatus 100 may recognize all of the vehicle plate numbers and the persons' faces included in the entire video, and list them or separately store them in a database.

As shown in FIG. 8, the video masking processing apparatus 100 may display at least one vehicle plate number or person's face included in the video in the form of a list using the masking information. In FIG. 8, three vehicle plate numbers 811, 812, and 813 and three persons' faces 821, 822, and 823 are included in the video.

Thereafter, when the user selects one of the vehicle plate numbers or the persons' faces, the video masking processing apparatus 100 may reproduce a part of the video that includes the selected vehicle plate number or person's face. This will be explained below with reference to FIGS. 9 and 10.

Figure 9:
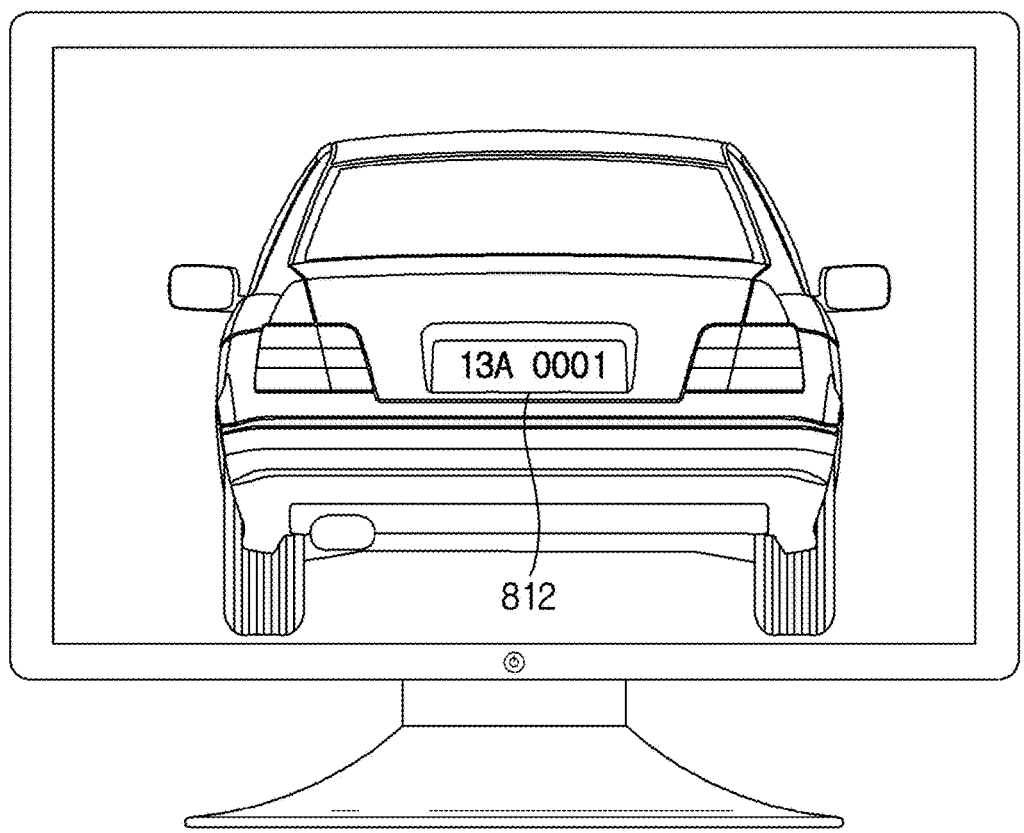
FIG. 9 is a view showing a screen which displays a video of a part including a vehicle plate number when the vehicle plate number is selected according to an exemplary embodiment of the present disclosure.

FIG. 9 is a view showing a screen which, when a vehicle plate number is selected, displays a video of a part including the selected vehicle plate number. When the second vehicle plate number 812 in FIG. 8 is selected, the video masking processing apparatus 100 directly reproduces the part including the second vehicle plate number 812 as shown in FIG. 9.

Figure 10:
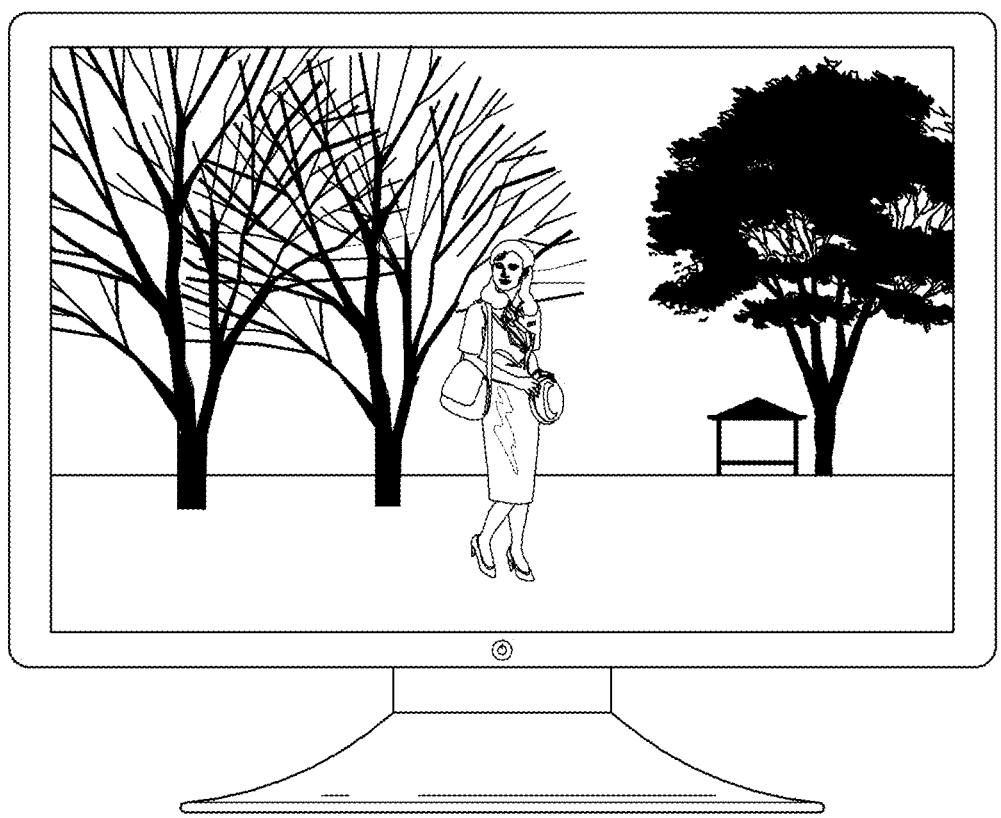
FIG. 10 is a view showing a screen which displays a video of a part including a person's face when the person's face is selected according to an exemplary embodiment of the present disclosure.

FIG. 10 is a view showing a screen which, when a person's face is selected, displays a video of a part including the selected person's face. When the third person's face 823 in FIG. 8 is selected, the video masking processing apparatus 100 directly reproduces the part including the third person's face 823 as shown in FIG. 10.

Through the above-described function, the user can easily search and identify the vehicle plate number or person's face in the masked video.

In addition, the video masking processing apparatus 100 may provide a function of searching a vehicle plate number or a person's face included in a video. This function will be explained in detail below with reference to FIGS. 11A, 11B, 12A and 12B.

Figure 11A:
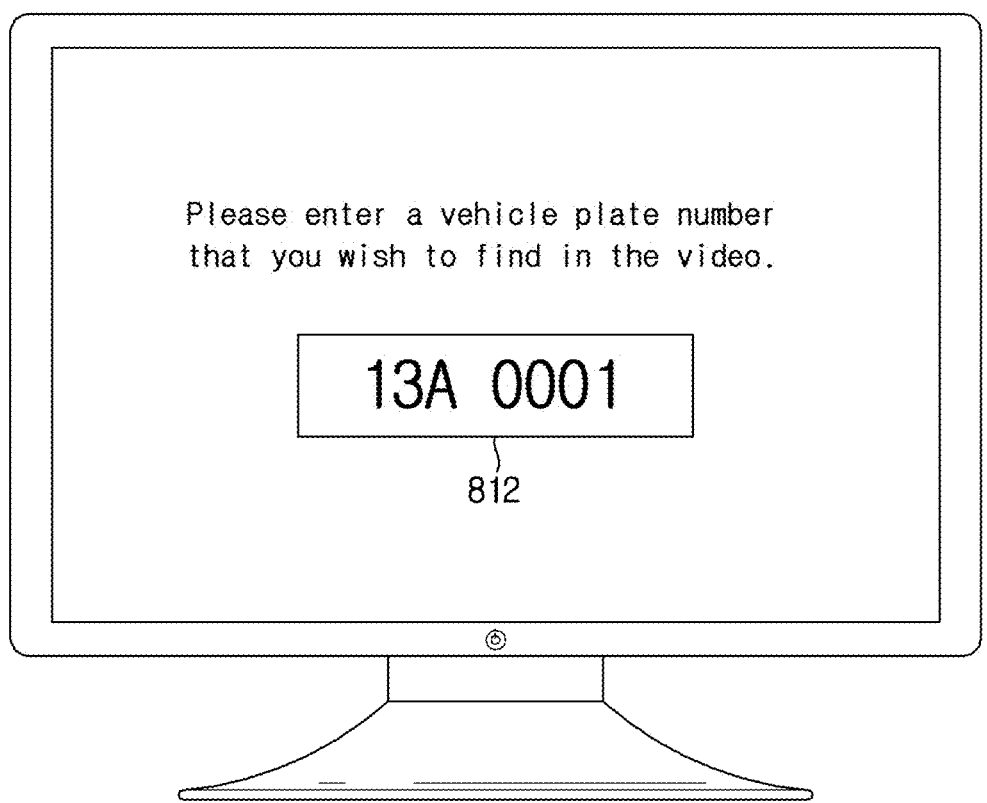
FIGS. 11A and 11B are views showing a process of searching a vehicle plate number included in a masking-processed video according to an exemplary embodiment of the present disclosure.
Figure 11B:
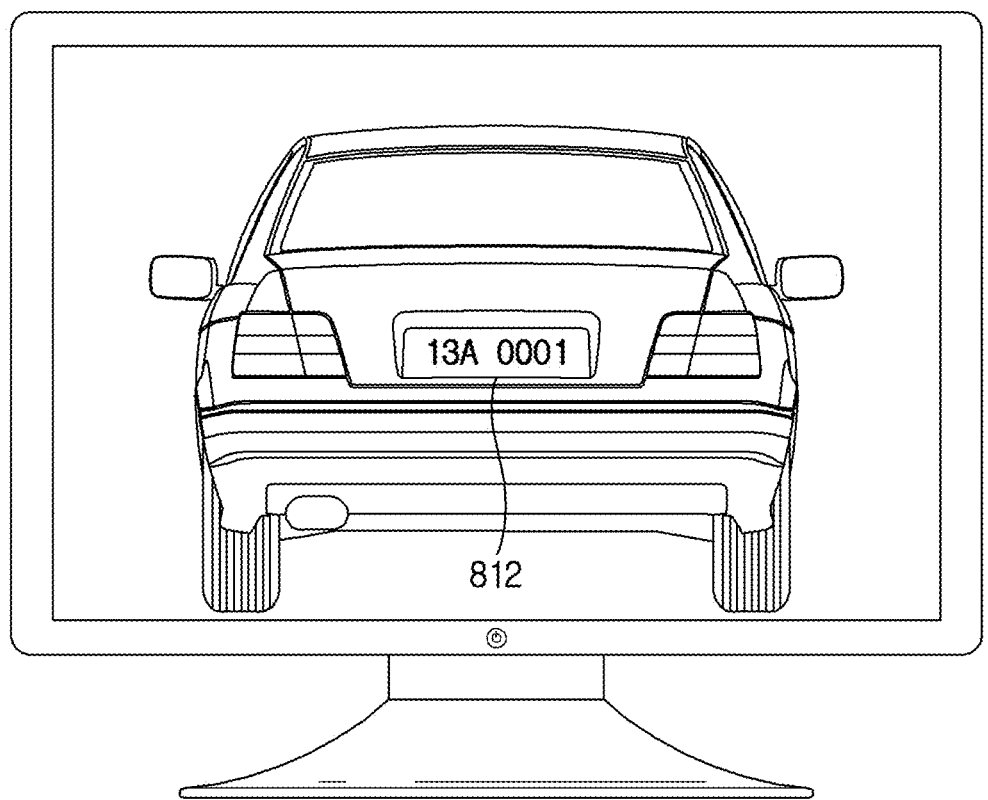

FIGS. 11A and 11B are views showing a process of searching a vehicle plate number included in a masking-processed video according to an exemplary embodiment of the present invention.

As shown in FIGS. 11A and 11B, when a vehicle plate number is input by the user, the video masking processing apparatus 100 recognizes at least one vehicle plate number included in the video using masking information included in the video, and reproduces a part of the video including the inputted vehicle plate number. In FIGS. 11A and 11B, the user inputs "13A 0001" as a number that the user wishes to search, and the video masking processing apparatus 100 may directly reproduces a part including "13A 0001."

Figure 12A:
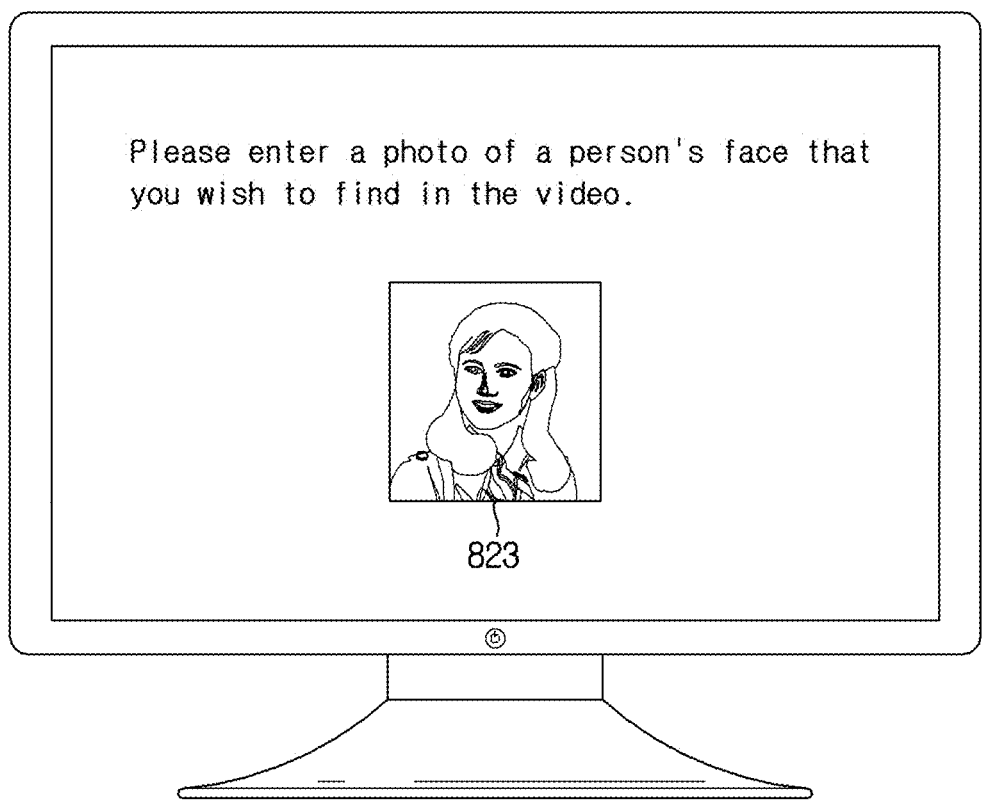
FIGS. 12A and 12B are views showing a process of searching a person's face included in a masking-processed video according to an exemplary embodiment of the present disclosure.
Figure 12B:
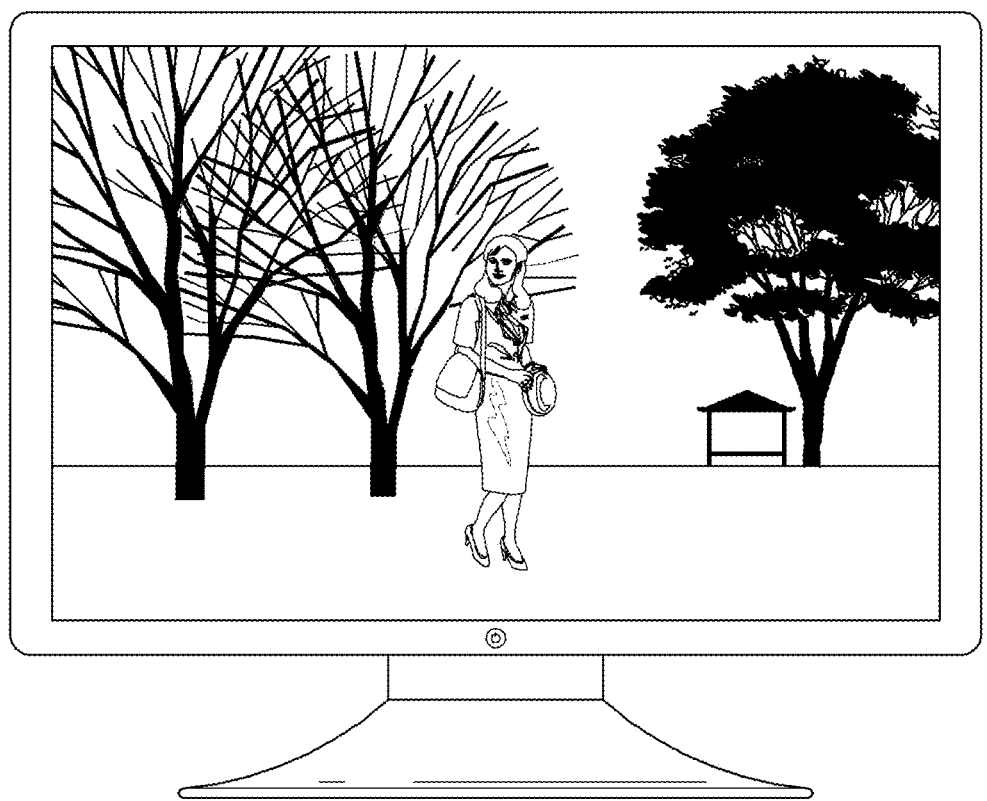

FIGS. 12A and 12B are views showing a process of searching a person's face included in a masking-processed video according to an exemplary embodiment of the present invention.

When a photo of a person's face is inputted by the user, the video masking processing apparatus 100 recognizes at least one person's face included in the video using masking information included in the video, compares the persons' faces included in the video with the inputted person's face photo through a face recognition technique, and directly reproduces a part of the video including the person's face matching the inputted person's face. In FIGS. 12A and 12B, the user inputs the photo of the person's face 823 that the user wishes to find, and the video masking processing apparatus 100 directly reproduces the part including the person's face 823.

Through the above-described function, the video masking processing apparatus 100 can easily search a vehicle plate number or a person's face included in the masking-processed video.

In addition, masking/unmasking may be performed for a person's face and a vehicle plate number using different keys. Specifically, in a video, masking areas where persons' faces appear may be masked/unmasked using key-1, and masking areas where vehicle plate numbers appear may be masked/unmasked using key-2.

Accordingly, in the video, the vehicle plate numbers may remain masked and only the persons' faces may be unmasked, or the persons' faces remain masked and only the vehicle plate numbers may be unmasked. The former case may be useful when only the persons' faces need to be identified since the vehicle plate numbers are not exposed, and the latter case may be useful when only the vehicle plate numbers in the video need to be identified since the persons' faces are not exposed.

However, to achieve this, the masking information should additionally include information on a type of masking area, that is, information on whether the masking area includes persons' faces or vehicle plate numbers. To unmask the video, the type of masking area included in the masking information may be determined, and key-1 may be used for the masking area including the persons' faces and key-2 may be used for the masking area including the vehicle plate numbers.

The technical idea of the present disclosure can be applied to a computer-readable recording medium which records a computer program for implementing the functions and methods of the apparatus according to the exemplary embodiments. In addition, the technical idea according to various exemplary embodiments of the present disclosure may be implemented in the form of a computer-readable programming language code which is recorded on the computer-readable recording medium. The computer-readable recording medium may be any data storage device that can be read by a computer and can store data. For example, the computer-readable recording medium may be a Read Only Memory (ROM), a Random Access Memory (RAM), a CD-ROM, a magnetic tape, a floppy disk, an optical disk, a hard disk drive, a flash memory, a Solid State Disk (SSD), etc. In addition, a computer-readable code or program stored in the computer-readable recording medium may be transmitted through a network connected between computers.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video masking processing method, comprising:
    detecting a masking area to be masked in a frame constituting a video;
    masking an image in the detected masking area;
    inserting masking information on the masked image into a predetermined pixel area of the frame;
    storing the frame comprising the inserted masking information;
    displaying a vehicle plate number or a human face included in the video using the inserted masking information; and
    when one of the vehicle plate number or human face is selected, reproducing a frame of the video that includes the selected vehicle plate number or human face,
    wherein the masking information comprises
        information on a number of masking areas in the frame, and
        masking area information corresponding to the number of the masking areas,
    wherein the masking area information comprises an identifier of a corresponding masking area, information on a masking technique code applied to the corresponding masking area, coordinates information of a left upper point of the corresponding masking area, and coordinates information of a right lower point of the corresponding masking area, and
    wherein the image in the detected masking area is masked using a different key according to an object type of the image.

2. The video masking processing method of claim 1, wherein the detected masking area comprises an image of a human face or a vehicle number plate.

3. The video masking processing method of claim 1, further comprising:
    transmitting a request to reproduce the video constituted by the frame comprising the inserted masking information;
    receiving a key for unmasking the video corresponding to the request; and
    unmasking the video using the key and reproducing the unmasked video.

4. A video masking processing apparatus, comprising:
    a processing unit configured to
        detect a masking area to be masked in a frame constituting a video,
        mask an image in the detected masking area, and
        insert masking information on the masked image into a predetermined pixel area of the frame; and
    a storage unit configured to store the frame comprising the inserted masking information,
    wherein the masking information comprises
        information on a number of masking areas in the frame, and
        masking area information corresponding to the number of the masking areas,
    wherein the masking area information comprises an identifier of a corresponding masking area, information on a masking technique code applied to the corresponding masking area, coordinates information of a left upper point of the corresponding masking area, and coordinates information of a right lower point of the corresponding masking area, and
    wherein the image in the detected masking area is masked using a different key according to an object type of the image.

* * * * *